Figure 1:
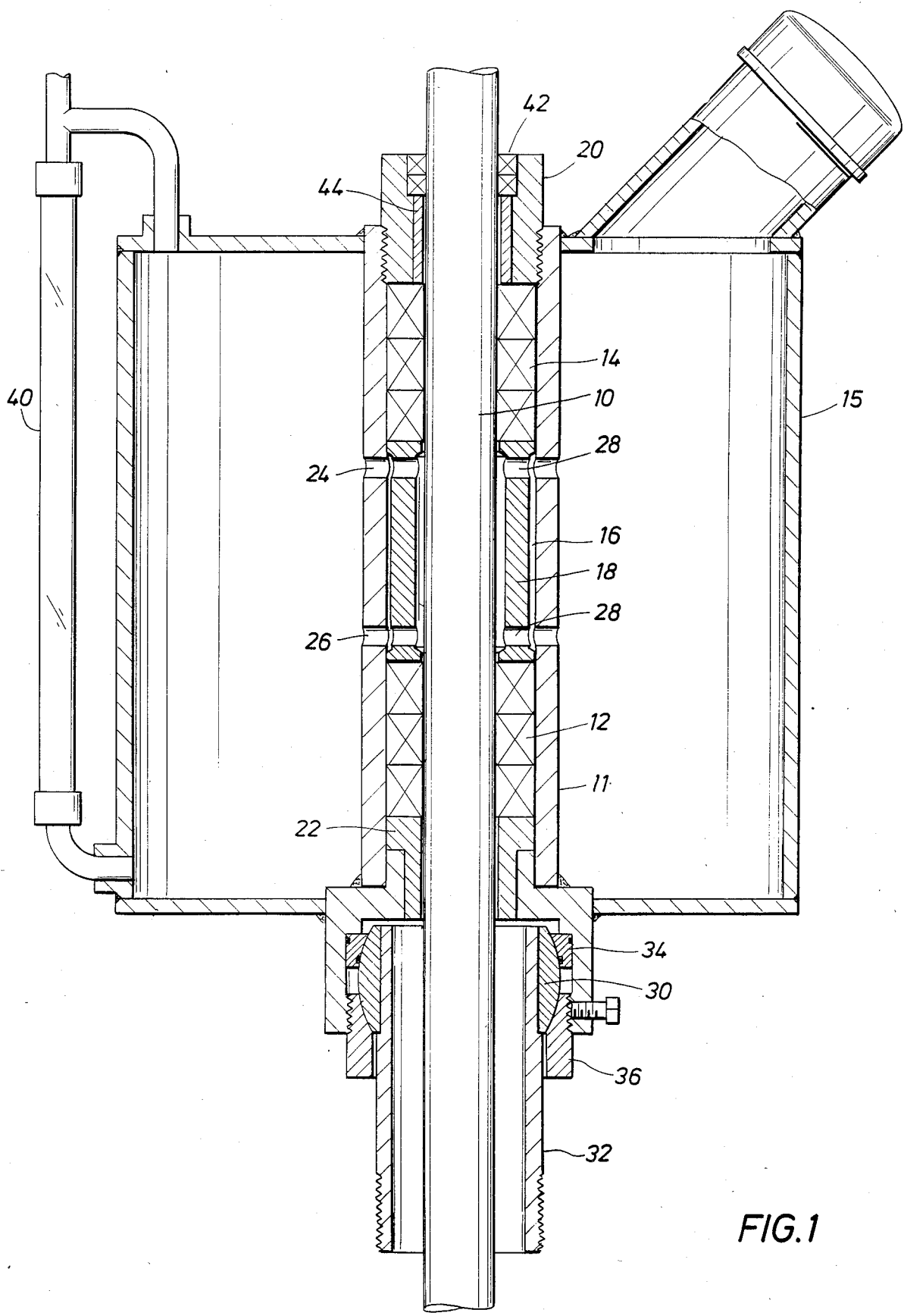

United States Patent [19]

Johnson

[11] Patent Number: 4,647,050

[45] Date of Patent: Mar. 3, 1987

[54] STUFFING BOX FOR A SUCKER ROD PUMP ASSEMBLY

[75] Inventor: Marvin B. Johnson, Elkhart, Kans.

[73] Assignee: Anadarko Production Company, Houston, Tex.

[21] Appl. No.: 757,455

[22] Filed: Jul. 22, 1985

[51] Int. Cl.[4] .......................... E21B 33/00; F16J 15/56
[52] U.S. Cl. .......................................... 277/19; 166/84; 277/2; 277/59; 277/79; 277/110
[58] Field of Search .................. 277/2, 4, 5, 18, 19, 277/22, 26, 30, 59, 68, 69, 70, 73, 75, 79, 71, 187, 188 R, 193, 110, 15; 73/323, 328; 184/24; 166/84

[56] References Cited

U.S. PATENT DOCUMENTS

| 722,219 | 3/1903 | Fielden | 277/68 X |
|---|---|---|---|
| 943,169 | 12/1909 | Stance et al. | 277/18 X |
| 1,557,706 | 10/1925 | Knox | 277/68 X |
| 2,628,112 | 2/1953 | Hebard | 277/68 X |
| 3,018,078 | 1/1962 | Holdren | 277/100 X |
| 3,468,374 | 9/1969 | Reeves | 277/15 X |
| 4,211,112 | 7/1980 | Norris | 73/328 X |
| 4,480,842 | 11/1984 | Mahyera et al. | 277/22 |

FOREIGN PATENT DOCUMENTS

| 506127 | 9/1954 | Canada | 277/15 |
|---|---|---|---|
| 542075 | 8/1922 | France | 277/30 |
| 657273 | 5/1929 | France | 277/135 |
| 192288 | 2/1923 | United Kingdom | 277/30 |

Primary Examiner—Allan N. Shoap
Attorney, Agent, or Firm—Vaden, Eickenroht, Thompson & Boulware

[57] ABSTRACT

A stuffing box for a sucker rod pump assembly is disclosed that utilizes natural convection currents generated in a lubricating fluid reservoir mounted on the housing of the stuffing box and in fluid communication with the interior of the housing to continuously displace the heated lubricating fluid in the interior of the housing with cooled lubricating fluid from the reservoir.

1 Claim, 1 Drawing Figure

STUFFING BOX FOR A SUCKER ROD PUMP ASSEMBLY

FIELD OF THE INVENTION

This invention relates to stuffing boxes generally, and in particular to stuffing boxes for sucker rod pump assemblies used in oil wells.

BACKGROUND OF THE INVENTION

A sucker rod pump assembly includes a pump located in the production tubing of an oil producing well below the level of the liquid in the well. The pump is operated by a string of reciprocating sucker rods that extend through the production tubing from the pump to the surface. The rods are reciprocated by a pump jack located at the surface. When the fluid being pumped reaches the surface, it is directed into a lateral flow line by a stuffing box mounted on the wellhead. The stuffing box has an opening through which the top sucker rod extends. Seals located in the stuffing box allow the sucker rods to reciprocate in the opening while preventing the pumped fluid from flowing through the opening. The top sucker rod is usually a special rod, called a "polish rod", with an outer surface that is machined to a very smooth finish to reduce the friction between the rod and the seals in the stuffing box.

The friction generated by the reciprocation of the polish rod, however well machined, through the seals produces heat. This heat contributes to the deterioration of the seals and the polish rod. The improved stuffing box of the present invention lubricates and at the same time cools the polish rod as it moves through the stuffing box in a manner requiring low maintenance, thereby increasing the life of the rod and packing at low cost.

Various prior art devices have attempted to align, cool or lubricate the stuffing box.

Stogner (U.S. Pat. No. 3,474,734) and Haentjens (U.S. Pat. No. 3,516,759) both provide for lubricating a stuffing box by means of reservoirs mounted separately from the housing of the stuffing box. Stogner teaches a stuffing box for a rotary pump, Haentjens for a centrifugal pump. In both schemes, lubricant is delivered to the interior of the stuffing box by means of a pressure delivery system. Neither Stogner nor Haentjens teach a system that allows the lubricant to freely circulate from the interior of the housing to the reservoir and back again. Neither system teaches cooling as well as lubricating. Both systems depend upon one-way valves and pressure to direct the passage of the lubricant to the chamber and to keep it there.

Orr (U.S. Pat. No. 3,209,630) discloses a stuffing box for mounting on the upper end of oil well tubing where a polish rod reciprocating through an "extension tube" section of the stuffing box is bathed in lubricating fluid supplied from an exterior reservoir mounted near the stuffing box. Orr does not provide for changing the lubricating fluid as it becomes heated and thus does not provide for cooling.

Reeves (U.S. Pat. No. 3,468,374) provides for cooling and lubricating a polish rod as it reciprocates in a stuffing box, however, Reeves does not use a lubricating fluid reservoir. Reeves uses the production fluid itself as the lubricating fluid and uses the high pressure in the production tubing to cause the lubricating fluid to flow into and out of the cooling and lubricating chamber. Appropriate one-way valves are provided. In the absence of high pressure production fluid, Reeves provides for only a static reserve of fluid that lubricates but does not circulate into and out of the lubricating chamber and thus does not cool the lubricating oil. Moreover, Reeve's scheme cannot cool below the temperature of the production fluid itself, which may be hot.

It is an object and feature of the present invention to provide a stuffing box for a sucker rod pump assembly wherein cooled lubricating fluid displaces continuously the heated lubricating fluid adjacent the polish rod by the convection currents produced by the heating of the lubricating fluid adjacent the polish rod and the cooling of the lubricating fluid away from the polish rod.

It is another object of this invention to provide a stuffing box having a tubular housing through which a polish rod may reciprocate with seals located in the housing that are spaced longitudinally to provide an annular chamber for lubricating fluid to surround the polish rod and a lubricating fluid reservoir from which cool lubricating fluid will flow into the bottom of the chamber and displace, by convection, lubricating fluid, warmed by the heat in the polish rod, from the top of the chamber back to the reservoir to be cooled.

These and other objects, advantages, and features of this invention will be apparent to those skilled in the art from a consideration of this specification including the attached drawing and appended claims.

FIG. 1 of the drawing is a vertical cross-sectional view of the preferred embodiment of the stuffing box of this invention.

The stuffing box comprises tubular housing 11 through which polish rod 10 reciprocates. Lower packing assembly 12 is located in the lower end of the housing to keep well fluid from entering the housing. Upper packing assembly 14 is located in the upper end of the housing to trap lubricating fluid in annular chamber 16 between the packing assemblies. Annular spacer 18 holds the two packing assemblies apart. The packing assemblies are compressed into sealing engagement with the rod and the housing by gland nut 20 acting through the spacer against lower bushing 22.

Lubricating fluid reservoir 15 is mounted on tubular housing 11 and is in fluid communication with annular chamber 16 through a plurality of longitudinally spaced ports 24 and 26 in the wall of the housing. By convection, cool lubricating fluid from the reservoir enters the chamber through lower ports 26 and displaces heated lubricating fluid from the chamber through upper ports 24. The heated fluid is carried by convection toward the outer wall of the reservoir where it cools. A plurality of longitudinally spaced ports 28 in the spacer allow the lubricating fluid to flow along the polish rod as the lubricating fluid moves upwardly in the chamber.

Both packing assemblies can be replaced through the top of the housing.

Preferably, the stuffing box is mounted on the wellhead (not shown) by a ball and socket connection. In the embodiment shown, ball 30 is attached to mounting nipple 32. Seal ring 34 and socket 36 have spherical surfaces that engage ball 30 to allow limited universal movement. The movement is limited by the clearance between socket 36 and the mounting nipple, but is ample to allow the stuffing box to accommodate the lateral movement of the polish rod when reciprocated by a pump jack that moves along an arcuate path.

Sight gauge 40 mounted on the reservoir quickly indicates the level of fluid in the reservoir. Seals 42 in gland nut 20 above wear sleeve 44 wipe the polish rod clean before it reaches the packing to keep sand and dust from shortening the life of the packing.

While a particular embodiment of the invention has been shown and described it will be understood that the invention is not limited thereto, since many modifications may be made and will become apparent to those skilled in the art.

From the foregoing it will be seen that this invention is one well adapted to attain all of the ends and objects hereinabove set forth, together with other advantages that are obvious and that are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A stuffing box for use with a sucker rod pump assembly for a producing well including a polish rod at the upper end of the sucker rods, comprising a tubular housing for mounting on the wellhead of a producing well through which the polish rod reciprocates, two longitudinally spaced packing assemblies located in said tubular housing in sealing engagement with the polish rod and the housing to provide an annular chamber for a lubricating fluid to surround the polish rod, a lubricating fluid reservoir mounted on said tubular housing and surrounding the portion of the housing in which the annular chamber is located, upper and lower ports in the housing adjacent the upper and lower ends of the chamber connecting the annular chamber with the lubricating fluid reservoir, said housing being imperforate between the ports, and a removable annular spacer located in the annular chamber between the packing assemblies to hold the packing assemblies spaced apart, said spacer having upper and lower ports adjacent the upper and lower end of the chamber and in substantially the same plane as the upper and lower ports in the housing, said spacer being imperforate between the upper and lower ports so that cooled lubricating fluid in said reservoir continuously enters said annular chamber through said lower port and displaces heated lubricating fluid in said annular chamber through said upper port as the polish rod reciprocates in said packing assemblies due to the different densities of the two fluids, said lubricating fluid in said annular chamber being continuously heated by the friction that is generated as the polish rod reciprocates in said packing assemblies while said lubricating fluid in said reservoir is continuously cooled by heat loss through the outer wall of said reservoir.

* * * * *